INVENTORS
JAN ANTHONY LELY
TIJS WILLEM VAN RIJSSEL
BY
AGENT

UNITED STATES PATENT OFFICE 2,558,492

TUBULAR X-RAY DIAPHRAGM

Jan Anthony Lely and Tijs Willem van Rijssel, Eindhoven, Netherlands, assignors to Hartford National Bank and Trust Company, Hartford, Conn., as trustee Application October 20, 1948, Serial No. 55,466
In the Netherlands November 26, 1947

5 Claims. (Cl. 250—105)

For analysing definite substances with the use of definition of X-rays by solid substances, it is important to observe very small deflection angles, i. e. the range below from 2° to 3°. For radiation at a wavelength of 1.54 A. (copper target as commonly used in crystal testing, this involves lattice-plane spacings exceeding from 30 to 40 A. In normal crystals these large crystallographic plane spacings do not occur but it is known that albumens may exhibit spacings of from 500 to 1000 A. The range scattering at small angles has also been found important for ascertaining the granular size of various materials, for example cellulose, rubber and finely powdered substances.

Researches of this kind require very fine beams of X-rays. From the known deflection formula $2d \sin \alpha = \lambda$ for very small angles, may be written as $d \sin 2\alpha = \lambda$ it follows that at $\lambda = 1.54$ A. and $d = 600$ A. $\sin 2\alpha = 2.5 \times 10^{-3}$, which corresponds to $2\alpha = 8.5'$. Hence the divergence of the primary beam must not exceed 4' relatively to the centre line if the deflected rays are to be kept separated from the primary beam.

It is known to isolate fine beams by using plate-shaped diaphragms, of which, as a rule, two are arranged in succession with some spacing. The scattered radiation occurring at the edges of the apertures in these diaphragms render the use of a third circumscribing member desirable in order that these scattered radiation may be retained. The narrower the beam is desired to be the smaller must be chosen the diaphragm apertures with the result that the intensity is lower, so that very long exposure times are required. When using such a combination of diaphragms it is not in the first place the fineness of the primary beam but the angle at which the scattered radiation emanates from the directional member, for which the above mentioned size must be considered, which involves a reduction in size of the apertures relatively to the size they might have in the absence of scattered radiation. The embodiment comprising plate-shaped diaphragms requires great accuracy and positioning of the secondary ray collector is particularly important, since the latter must be as narrow as possible but must not intercept primary radiation since the latter would again lead to the production of scattered rays.

By utilizing the property, that at small angles of incidence (10 to 30') X-rays are totally reflected by polished substances, it has already been possible to localize narrow beams which, as compared with the beams obtained by diaphragms, have appreciably higher intensity. These reflection channels have a disadvantage in that the divergence of the beam is determined by the limit angle of the total reflection. The natural divergence resulting therefrom is higher than is permissible for the aforesaid researches. In order to achieve satisfactory results, provision would consequently have to be made at the entry side of the reflection channel of a further device for realizing a beam of very small divergence, and this completely annuls the advantages of the channel.

The invention relates to a limit diaphragm, with the use of which a narrow beam is realized by total reflection of the X-rays. An object of the invention is to reduce the divergence of the beam while maintaining the advantages of the known device. According to the invention, the entry port of the deflection channel and the exit port are of different size, so that the channel becomes conical or wedge-like and exhibits a length such that those X-rays of a beam entering the smallest port which enter the deflection channel at an angle equal to the limit angle are reflected once or several times of the tube-wall material.

In such a channel, the angle at which the X-rays are with the axis becomes smaller after each reflection, so that, if the number of reflection is sufficiently large, practically any desired smaller divergence of the emanating beam may be realized.

For the wall of the reflection channel use is preferably made of material, the atoms of which are not liable to emit secondary radiation under the action of incident X-rays. Since, however, radiation of greater wavelength is absorbed to a greater extent it can be retained with the use of a metal filter and the wall material may be constituted by substances, the natural radiation of which has a large wavelength as compared with the primary radiation. The operations to which the wall of the channel must be subjected so as to obtain the glass required for total reflection may be responsible for penetration of metal atoms into the surface. When polishing, care should therefore be taken that the polishing powder does not contain metal atoms which, on being struck by X-rays, have a natural radiation at a wavelength of the same order of magnitude as the primary radiation. Occurrence of troublesome stray radiation is thus obviated.

A further source of harmful radiation with a reflection channel is attentuated automatically. The spectrum of a radiation produced in an X-ray tube and originating from a given metal exhibits a maximum of intensity for radiation of a given wavelength but in addition appreciable intensities in a number of ranges of shorter wavelengths. For these shorter wavelengths the limit angle at which the wall surface must be struck in order that the rays may just be reflected decreases approximately in proportion to the wavelength. The radiation of shorter wavelengths is thus withdrawn to a large extent from the reflected beam, so that upon reflection the beam of rays exhibits more the pattern of a monochromatic beam.

Limiting diaphragms for the passage of a narrow beam of X-rays of low divergence are particularly suitable for use in apparatus for testing the structure of substances and the invention also relates to such an apparatus for testing substances the lattice-plane spacings of which exceed 100 Å.

In order that the invention may be more clearly understood and readily carried into effect, it will now be described more fully with reference to the accompanying drawing.

For illustrating the advantages of the invention, the various systems will be compared hereinafter.

Fig. 2 shows a beam channel, in which use is made of the total reflection of the X-rays and in which entry and exit ports are of equal size whereas

The angle at which a beam of X-rays on passing through the article to be tested must be deflected in order to bring about distinct blackening of the recording film, should be such as to cause the point of impact to fall outside the range blackened by the undeflected rays. The diffraction image obtained from the article to be tested exhibits natural dimensions which are a reflection of those of the primary beam, since upon diffraction in principle, the primary beam is reproduced. According to Fig. 1 the latter has a divergence $\varphi$.

Allowing for the scattered radiation occurring at the edges of the apertures in the thin diaphragms, provision is made not only of these diaphragms A and B but also of a plate C, which exhibits a larger aperture than A and B so as to allow the radiation issuing from the X-ray tube to pass without obstruction. The edge of the aperture in B serves as a limiter of this radiation and is a source of scattered radiation. The divergence of this radiation is determined by the width of the aperture in C. The spacings between the plates A—B and B—C are assumed to be equal, so that the divergence of the scattered radiation is $2\varphi$ and the aperture in C is three times as large as in A and B. The intensity of the scattered radiation, although only about 1% of that of the primary beam, is sufficient to cause the unrefracted secondary rays to produce a blackening of the recording material which is appreciable compared with that of the diffraction images. However, the deflected secondary rays are weakened to such an extent that the deflection image reveals substantially nothing thereof. On the basis of these considerations it is sufficient if the direct secondary rays do not occur in the diffraction image of the primary beam to be separately observed, if the deflection of the rays takes place through an angle of at least $3\varphi$.

According to the known formula $d \sin 2\alpha = \lambda$, for determining lattice-plane spacings of 1000 Å., 530 Å., 350 Å. and 265 Å. the deflection angles are 5', 10', 15' and 20' respectively if use is made of X-rays of a wave-length $\lambda = 1.54$ Å. emanating from an X-ray tube in which a copper target serves as the source of rays, the permissible divergence $\varphi$ for the primary radiation being consequently $1\frac{2}{3}'$, $3\frac{1}{3}'$, 5' and $6\frac{2}{3}'$ maximum respectively, and the angle within which stray radiation is allowed to occur not exceeding $3\frac{1}{3}'$ $6\frac{2}{3}'$, 10' and $13\frac{1}{3}'$.

Figure 1:
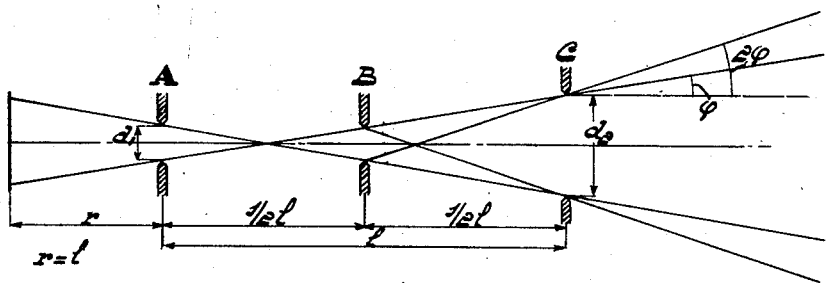
Fig. 1 shows how beam limiting is effected by apertured discs of material absorbing X-rays, which discs are arranged in succession with some spacing.
Figure 2:
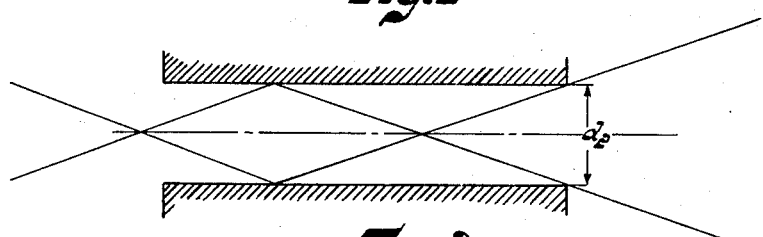

With the reflection channel shown in Fig. 2 there is produced around a beam emanating from the channel with a divergence $\varphi$, as a result of various effects, also a scattered radiation, which, as in the case of Fig. 1, constitutes the limit, to which an image projected by the deflected radiation is allowed to approach the primary radiation in order that it may be discerned. The angle at which this separation is viewed from the exit port of the beam channel is found to be smaller than twice the angle of divergence of the primary radiation, so that in this respect conditions are slightly more favourable than in the case of Fig. 1.

With the beam channel shown in Fig. 2, as in the device shown in Fig. 1, the divergence of the beam on the entry side and that on the exit side are equal. Consequently, in this respect replacement of the plates A, B and C by a beam channel does not yield any improvement. The desired divergence are materially smaller than the limit angle at which incident radiation is just reflected at the surface. In order to realize the said small divergence it will be necessary to use the reflection channel in conjunction with measures operative to cut off rays of greater divergence, for example, with the system shown in Fig. 1, but it is obvious that in this case not a single advantage is realized. Consequently, the embodiment shown in Fig. 2 is not expedient to produce X-ray beams the divergence of which is smaller than the limit angle at which the material used reflects X-rays.

Figure 3:
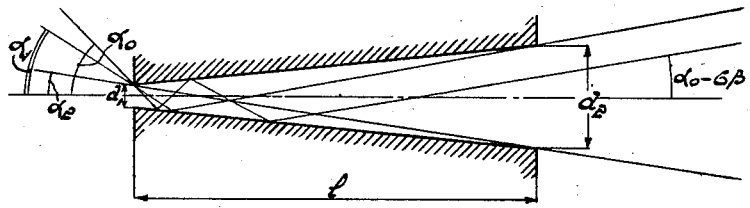
Fig. 3 shows a beam channel according to the invention.

In contradistinction to this, the device according to the invention, which is shown in Fig. 3, presents an advantage with respect to the divergence in that, after each reflection, the divergence becomes smaller by an angle $2\beta$, $\beta$ denoting the angle at which the reflecting walls of the channel are with the axis, Fig. 3 illustrates the case wherein different rays enter the channel just along the edge of the aperture $d_1$. The ray falling just along the edge of the aperture and leaving the channel without being reflected from the wall enters the channel at an angle $\alpha_2$ with the axis and, hence, leaves the channel at the same angle. No ray can leave the channel at a larger angle with the axis. The length $l$ of the channel is then defined by the equation:

$$l = \frac{d_1 + d_2}{2 \tan \alpha_2}$$

This is the shortest possible length the channel may have if the angle of divergence of the beam should not exceed $\alpha_2$. If the beam is to have a smaller angle of divergence than the limit angle the channel must be slightly longer than that which follows the above equation when the value of the said limit angle is inserted for $\alpha_2$. In this case, the ray leaves the channel after one reflection, so that the divergence of the beam emanating from the channel would be $a_2-2\beta$. This means that the ray may enter the channel at an angle of $a_2+2\beta$ to obtain the same divergence $a_2$ of the beam at the exit side. Such a ray falling just along the edge of the aperture $d_1$, and after one reflection leaves the channel without further reflection enters the channel at an angle $a_1$ with the axis.

A suitable choice of the angle and length of the channel is possible to produce a beam of any divergence having an angle of aperture smaller than the limit angle. If, for example, a ray enters the channel just along the edge of the aperture $d_1$ at an angle $a_0$ with the channel axis which is equal to the limit angle, so that the ray strikes the opposite wall of the channel and is reflected three times, the divergence of the beam emanating from the channel is $a_0-6\beta$ at an angle $a_0=2n\beta$ the divergence has become zero after $n$ reflections. At an angle $a=(2n+1)\beta$ the divergence is $\beta$ after $n$ reflections. If the length of the channel is sufficient, the divergence, consequently, need not exceed $\beta$, but if, for this purpose, the channel should become excessively long, the divergence can nevertheless be reduced to $3\beta$ by omitting one reflection.

Thus, for example, in the embodiment shown, in which $(2n+1)\beta > a_0 > 2n\beta$, the number of possible reflections $n=4$, but only three of them are used, so that the divergence of the emanating beam is comprised between $2\beta$ and $3\beta$, whereas the initial beam divergence is comprised between $8\beta$ and $9\beta$.

For obtaining beams of small divergence suitable for the analysis concerned, the entry port will not be made larger than half the size of the exit port in order to keep the length of the channel within adequate limits.

Also as far as the intensity of the beam is concerned the results obtained with the device according to the invention is more favourable than with a channel in which the beam is limited by plate-shaped diaphragms.

A particular advantage of the device according to the invention resides in the easy adjustability relatively to the source of rays. In the system comprising perforated screens the axis must be accurately directed towards the source of rays, that is to say that it must be possible for the source of rays to be viewed from all points of the aperture in C. The collimator will be arranged in such manner that the entire focus is embraced, because the energy supplied by the focus is thus used to the optimum. Even a small deviation from the correct position consequently involves loss of rays. Such deviations may be due even to vibrations, so that during the arrangement considerable precautions have to be taken.

With the reflection channel careful watch has to be kept in particular to see that the entry port is correctly positioned relatively to the source of rays. The adjustment is then effected by turning the channel about the point of intersection of the axis with the plane of this aperture until the brightness of a screen arranged on the exit side and struck by the emanating beam has a maximum value. The adjustment is considerably less critical and may thus be effected in a simple manner.

Figure 4:
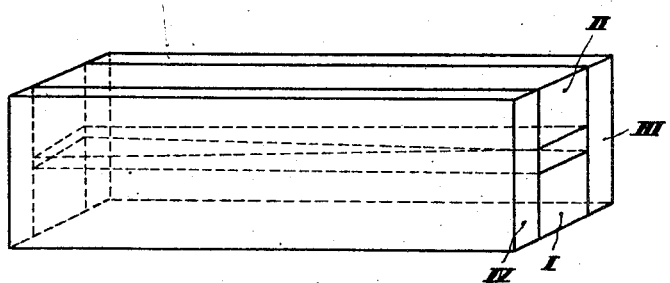

Fig. 4 shows a slot-shaped beam channel built up in a simple manner. Two glass plates I and II, each of which has an accurately polished edge are arranged on a substratum, the said edges facing one another. By arranging at one end between the plates a metal strip having exactly the thickness which corresponds to the width of the entry port and by arranging on the exit side a strip, the thickness of which corresponds to the width of the exit aperture, the glass plates together with the bottom layer III and a top layer IV to be provided may be united to form a single unit, use being made of a suitable adhesive. On removal of the spacing strips the beam channel is completed.

Similarly, by using four or more unilaterally polished plates it is possible to obtain an arrangement for a many-sided beam channel.

What we claim is:

1. A diaphragm for limiting the divergence of an X-ray beam comprising a tubular channel member having an entry aperture with a given cross-sectional dimension and an exit aperture having a cross-sectional dimension greater than the said cross-sectional dimension of said entry aperture and reflecting internal walls, the channel having uniformly convergent walls and having a length at which those rays of a beam of X-rays which enter the aperture having the smaller cross-sectional dimension at an angle equal to the limit angle of reflection from the tube wall are reflected at least once from the wall of the channel.

2. A diaphragm for limiting the divergence of an X-ray beam comprising a tubular channel member having an entry port and an exit port and reflecting internal walls, the entry and exit ports having respective cross-sectional dimensions designated $d_1$ and $d_2$ which differ from one another, the channel having a length $l$ defined by the equation:

$$l=\frac{d_1+d_2}{2\tan\alpha_2}$$

in which $\alpha_2$ is the angle which limits the greatest possible divergence the beam can have.

3. A diaphragm for limiting the divergence of an X-ray beam comprising a tubular channel member having an entry port and an exit port and consisting of a material which only reflects incident primary radiation and which emits natural radiation having a relatively large wavelength in comparison with the primary radiation, the entry and exit ports having respective cross-sectional dimensions $d_1$ and $d_2$ which differ from one another, and the channel having a length $l$ defined by the equation:

$$l=\frac{d_1+d_2}{2\tan\alpha_2}$$

in which $\alpha_2$ is the angle which limits the greatest possible divergence the beam can have.

4. A diaphragm for limiting the divergence of an X-ray beam comprising a tubular channel member having an entry port and an exit port and having internally reflecting walls, the entry and exit ports having respective cross-sectional dimensions designated $d_1$ and $d_2$, the dimension $d_1$ being smaller than one-half of $d_2$, the channel having a length $l$ defined by the equation:

$$l=\frac{d_1+d_2}{2\tan\alpha_2}$$

in which $\alpha_2$ is the angle which limits the greatest possible divergence the beam can have.

5. A diaphragm for limiting the divergence of an X-ray beam comprising a tubular channel member of glass having an entry port and an exit port, the entry and exit ports having respective cross-sectional dimensions, designated $d_1$ and $d_2$, the dimension $d_1$ being smaller than one-half of $d_2$, the channel having a length $l$ defined by the equation:

$$l = \frac{d_1 + d_2}{2 \tan \alpha_2}$$

in which $\alpha_2$ is the angle which limits the greatest possible divergence the beam can have.

JAN ANTHONY LELY.
TIJS WILLEM van RIJSSEL.

REFERENCES CITED

The following references are of record in the file of this patent:

UNITED STATES PATENTS

| Number | Name | Date |
|---|---|---|
| 1,600,867 | Coolidge | Sept. 21, 1926 |
| 1,865,441 | Mutscheller | July 5, 1932 |
| 1,993,058 | Hahn | Mar. 5, 1935 |
| 2,331,586 | Waisco | Oct. 12, 1943 |

FOREIGN PATENTS

| Number | Country | Date |
|---|---|---|
| 506,022 | Great Britain | May 22, 1939 |
| 601,545 | France | Dec. 1, 1925 |

OTHER REFERENCES

X-Ray Diffraction Camera for Microtechniques, by P. Chesley, R. S. I., June 1947, page 422.

Structure of Metals, Barrett, 1943 edition, pps. 117–118.

X-Rays and Electrons, by A. H. Compton, D. Van Nostrand Co., 1926, pages 36, 37, 215, 216, 217.